US011342087B2

(12) United States Patent
Hwang et al.

(10) Patent No.: US 11,342,087 B2
(45) Date of Patent: May 24, 2022

(54) NUCLEAR REACTOR DECOMMISSIONING SYSTEM

(71) Applicant: KOREA HYDRO & NUCLEAR POWER CO., LTD., Gyeongju-si (KR)

(72) Inventors: Young Hwan Hwang, Daejeon (KR); Mi-Hyun Lee, Daejeon (KR); Ju-Young Yoon, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 0 days.

(21) Appl. No.: 17/257,360

(22) PCT Filed: Jul. 3, 2019

(86) PCT No.: PCT/KR2019/008124
§ 371 (c)(1),
(2) Date: Dec. 31, 2020

(87) PCT Pub. No.: WO2020/009468
PCT Pub. Date: Jan. 9, 2020

(65) Prior Publication Data
US 2021/0183531 A1   Jun. 17, 2021

(30) Foreign Application Priority Data

Jul. 6, 2018   (KR) .......................... 10-2018-0078939

(51) Int. Cl.
*G21D 1/00* (2006.01)
(52) U.S. Cl.
CPC .................................. *G21D 1/003* (2013.01)

(58) Field of Classification Search
None
See application file for complete search history.

(56) References Cited

U.S. PATENT DOCUMENTS

| 4,919,881 A | 4/1990 | Hankinson et al. |
| 9,087,618 B2 * | 7/2015 | Park .................. G21F 9/305 |
| 2002/0186806 A1 * | 12/2002 | Aoki ..................... G21D 1/003 |
| | | 376/260 |

FOREIGN PATENT DOCUMENTS

| JP | 08-075892 | 3/1996 |
| JP | 08-240693 | 9/1996 |
| JP | 09145882 A * | 6/1997 |
| JP | 10-090493 | 4/1998 |
| JP | 10-111397 | 4/1998 |
| JP | 2012-093181 | 5/2012 |
| JP | 2012-230084 | 11/2012 |
| KR | 1990-0002340 | 2/1990 |
| KR | 10-0631472 | 10/2006 |
| KR | 1503288 | 3/2015 |
| KR | 2015-0138126 | 12/2015 |

(Continued)

OTHER PUBLICATIONS

EPO, Search Report of EP 19831384.3 dated Mar. 9, 2022.

*Primary Examiner* — Lily C Garner
(74) *Attorney, Agent, or Firm* — Lex IP Meister, PLLC

(57) ABSTRACT

A nuclear reactor decommissioning system according to an embodiment includes a cutting device to cut a reactor, a lifting device inserted inside the reactor to lift the reactor, and a shielding device that is positioned between the reactor and the lifting device and blocks radioactive dust generated by the cutting device from spreading.

7 Claims, 5 Drawing Sheets

(56) References Cited

FOREIGN PATENT DOCUMENTS

KR        10-1754538      7/2017
KR        101754538 B1 *  7/2017

* cited by examiner

NUCLEAR REACTOR DECOMMISSIONING SYSTEM

TECHNICAL FIELD

The present invention relates to a nuclear reactor decommissioning system.

BACKGROUND ART

As fossil energy is depleted worldwide, nuclear power generation is being used as a major energy source. In such nuclear power generation, a generally-used pressurized water reactor (PWR) nuclear power plant consists of a primary system circulating through a nuclear reactor, a secondary system circulating through a steam generator, and a tertiary system circulating through a condenser. Specifically, in the primary system, pressure is applied to a coolant in a reactor to maintain a pressure of 150 atm and 300° C., and in the secondary system, the coolant passes through tubes of a steam generator and boils water of the steam generator side to generate steam to turn a turbine. In the tertiary system, the steam turns the turbine, and then passes through the condenser and becomes water again and is sent to the steam generator.

Since the reactor of such a pressurized water reactor type of nuclear power plant is contaminated with radioactivity, when the reactor is cut and dismantled, radioactive dust such as aerosol and slag may diffuse and contaminate peripheral devices.

DISCLOSURE

Technical Problem

The present embodiment relates to a nuclear reactor decommissioning system that may prevent contamination of peripheral devices by radioactive dust generated during a decommissioning process thereof.

Technical Solution

A nuclear reactor decommissioning system according to an embodiment includes: a cutting device to cut a reactor, a lifting device inserted inside the reactor to lift the reactor, and a shielding device that is positioned between the reactor and the lifting device and blocks radioactive dust generated by the cutting device from spreading.

The lifting device may include a coupling member coupled to the reactor, and an elevating device that is connected to the coupling member and elevates the reactor, and the shielding device may include a shielding tube including a plurality of cylindrical members of different diameters surrounding the elevating device, and a shielding plate positioned on an upper portion of the shielding tube and blocking the reactor from the outside.

The plurality of cylindrical members may have a larger diameter as a distance from the elevating device increases, and respective end portions of the cylindrical member may have catching projections to be caught by respective end portions of adjacent cylindrical member.

The catching projection may include an outer catching projection extending from the cylindrical member to the outside, and an inner catching projection extending from the cylindrical member to the inside.

When the reactor is lifted by the lifting device, at least some of the cylindrical members of the shielding tube may be lifted together.

The shielding plate may include a plurality of ventilation parts positioned between the reactor and the outermost cylindrical member of the shielding tube.

The plurality of ventilation parts may be formed along an edge of the shielding plate.

A dust collecting device connected to the plurality of ventilation parts to collect the radioactive dust may be further included.

Advantageous Effects

According to the embodiment, it is possible to easily adjust a length of a shielding device according to a cutting process of a reactor, by installing a length-adjustable shielding device between the reactor and a lifting device. Therefore, diffusion of radioactive dust generated by a cutting device for cutting the reactor may be easily blocked.

In addition, it is possible to minimize radioactive dust from contaminating a peripheral device or being exposed to a worker, by intensively collecting the radioactive dust through a ventilation part formed on a shielding plate.

MODE FOR INVENTION

Figure 1:
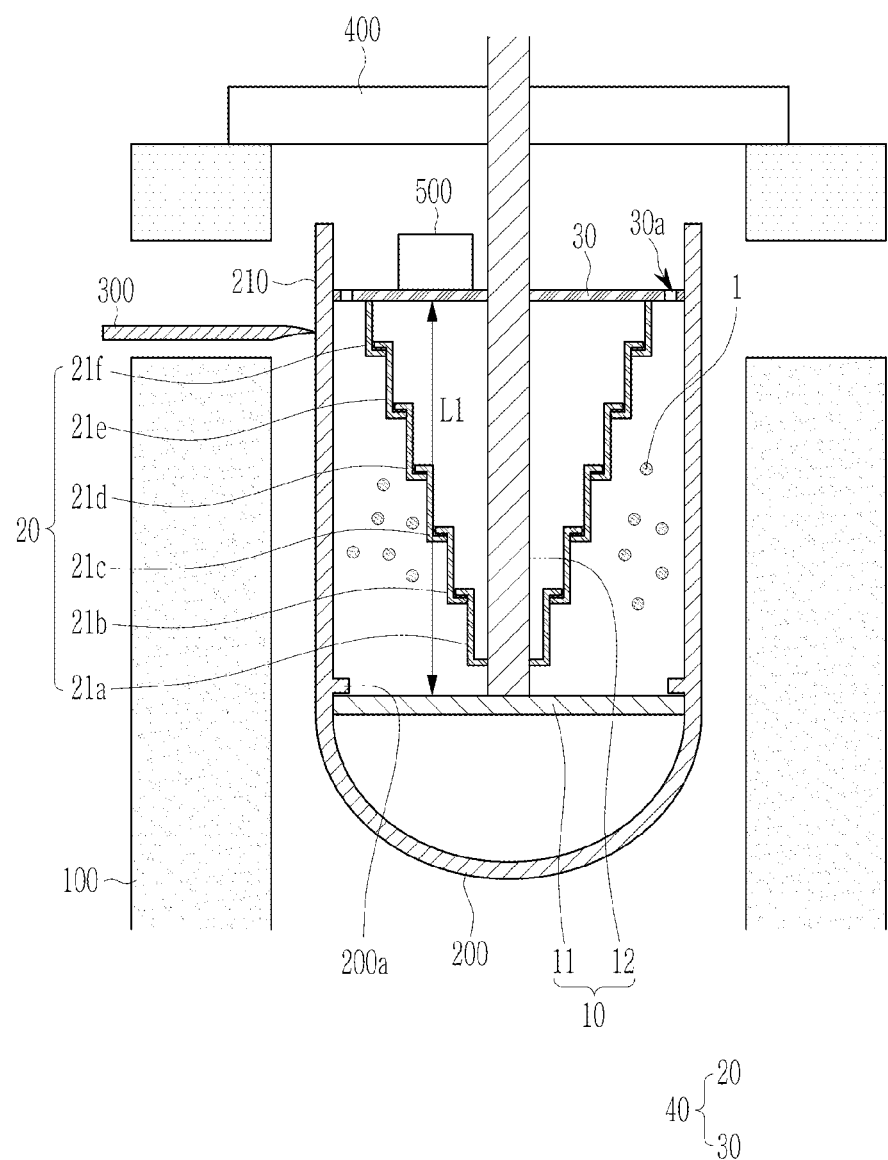
FIG. 1 illustrates a cross-sectional view of a nuclear reactor decommissioning system according to an embodiment.

The present invention will be described more fully hereinafter with reference to the accompanying drawings, in which embodiments of the invention are shown. As those skilled in the art would realize, the described embodiment may be modified in various different ways, all without departing from the spirit or scope of the present invention.

In order to clearly describe the present invention, parts that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings.

Figure 2:
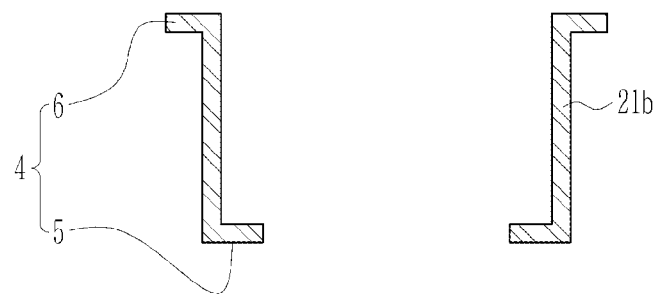
FIG. 2 illustrates an enlarged cross-sectional view of one cylindrical member of FIG. 1.
Figure 3:
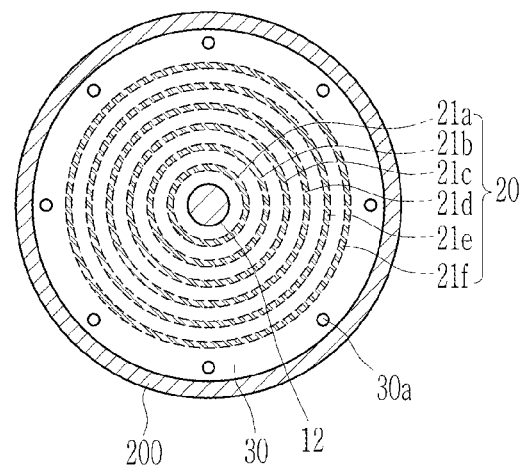
FIG. 3 illustrates a cross-sectional view of a nuclear reactor decommissioning system according to an embodiment.

FIG. 1 illustrates a cross-sectional view of a nuclear reactor decommissioning system according to an embodiment, FIG. 2 illustrates an enlarged cross-sectional view of one cylindrical member of FIG. 1, and FIG. 3 illustrates a cross-sectional view of a nuclear reactor decommissioning system according to an embodiment.

As shown in FIG. 1 to FIG. 3, a nuclear reactor decommissioning system according to an embodiment includes a cutting device 300 for cutting a reactor 200, a lifting device 10 for lifting the reactor 200, a shielding device 40 for blocking diffusion of radioactive dust 1 generated while cutting the reactor 200, a dust blocking device 400 for blocking bioprotective concrete 100 surrounding the reactor 200 from the outside, and a dust collecting device 500 for collecting the radioactive dust 1.

The cutting device 300 may include a thermal cutting device, a mechanical cutting device such as a wire saw, or an electrical cutting device such as a laser. However, the cutting device is not limited thereto, and various devices that may cut the reactor are applicable thereto.

The lifting device 10 may be inserted into the reactor 200 to lift the reactor 200. The lifting device 10 may include a coupling member 11 coupled to a coupling protrusion 200a to be protruded inside the reactor 200, and an elevating device 12 connected to the coupling member 11 and lifting the reactor 200.

The coupling member 11 has a disk-like shape. However, it is not limited thereto, and various shapes that may be inserted inside the reactor 200 to be combined with the reactor 200 are applicable.

The elevating device 12 may have a rod-like shape that is connected to a central portion of the disk-shaped coupling member 11 to lift the coupling member 11 together.

The shielding device 40 is positioned between the reactor 200 and the lifting device 10 to be able to block the diffusion of the radioactive dust 1 generated by the cutting device 300 that cuts an upper end portion 210 of the reactor 200. The shielding device 40 may include a shielding tube 20 including a plurality of cylindrical members 21a, 21b, 21c, 21d, 21e, and 21f of different diameters surrounding the elevating device 12, and a shielding plate 30 positioned on an upper portion of the shielding tube 20 and blocking the reactor 200 from the outside.

In the present embodiment, the shielding tube 20 is shown as consisting of six cylindrical members 21a, 21b, 21c, 21d, 21e, and 21f, but is not limited thereto, and it may be configured of cylindrical members in various numbers.

A plurality of cylindrical members 21a, 21b, 21c, 21d, 21e, and 21f forming the shielding tube 20 may have a larger diameter as a distance from the elevating device 12 increases. Accordingly, as shown in FIG. 1, the shielding tube 20 may have a stepped shape as a whole when it is not in contact with the elevating device 12 of the lifting device 10.

As shown in FIG. 1 and FIG. 2, respective end portions of the cylindrical members 21a, 21b, 21c, 21d, 21e, and 21f may have a catching projection 4 to be locked to respective end portions of adjacent cylindrical members 21a, 21b, 21c, 21d, 21e, and 21f. In FIG. 2, one cylindrical member 21b will be mainly described in detail. As shown in FIG. 2, the catching projection 4 may include an outer catching projection 6 extending from the cylindrical member 21b to the outside, and an inner catching projection 5 extending from the cylindrical member 21b to the inside. In the present embodiment, the outer catching projection 6 may be positioned at an upper end portion of the cylindrical member 21b, and the inner catching projection 5 may be positioned at a lower end portion of the cylindrical member 21b, based on a direction of gravity.

Therefore, as shown in FIG. 1, the inner catching projection 5 and the outer catching projection 6 of the adjacent cylindrical members 21a, 21b, 21c, 21d, 21e, and 21f contact each other, so that the shielding tube 20 has a entirely step shape by gravity.

Therefore, even if the reactor 200 is cut by using the cutting device 300, the shielding device 40 may block the radioactive dust 1 such as slag, fume gas, and aerosol from contaminating the lifting device 10.

Figure 4:
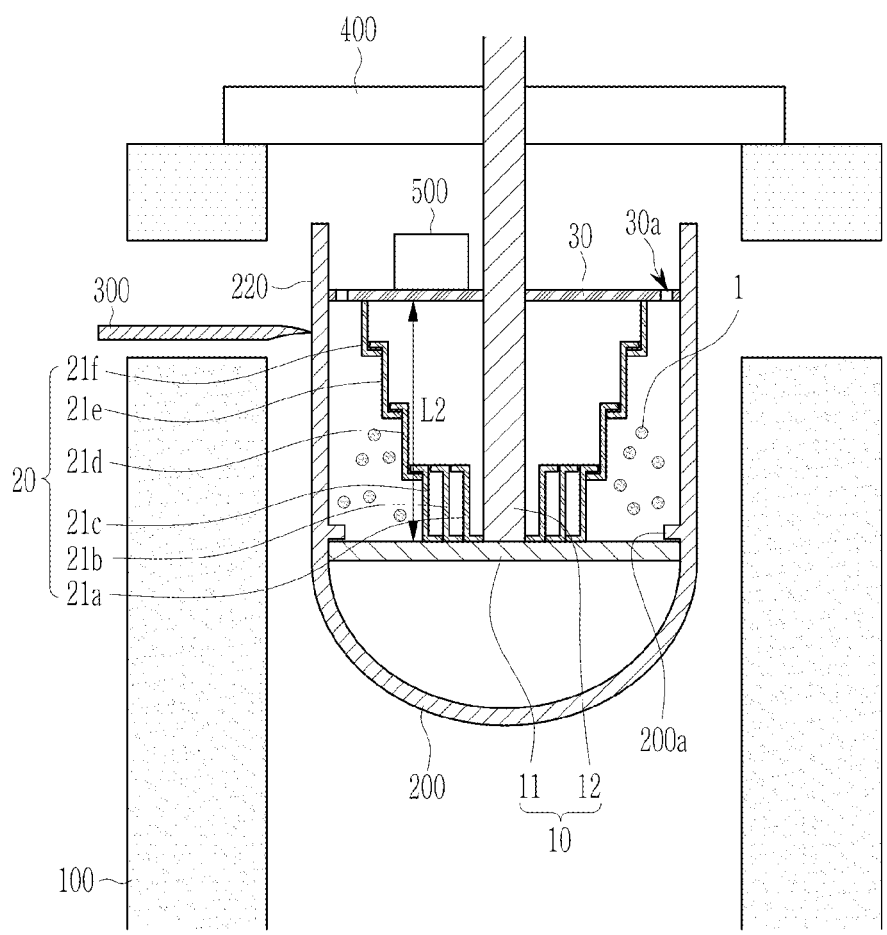
FIG. 4 illustrates a cross-sectional view of one step of decommissioning a reactor using a nuclear reactor decommissioning system according to an embodiment.
Figure 5:
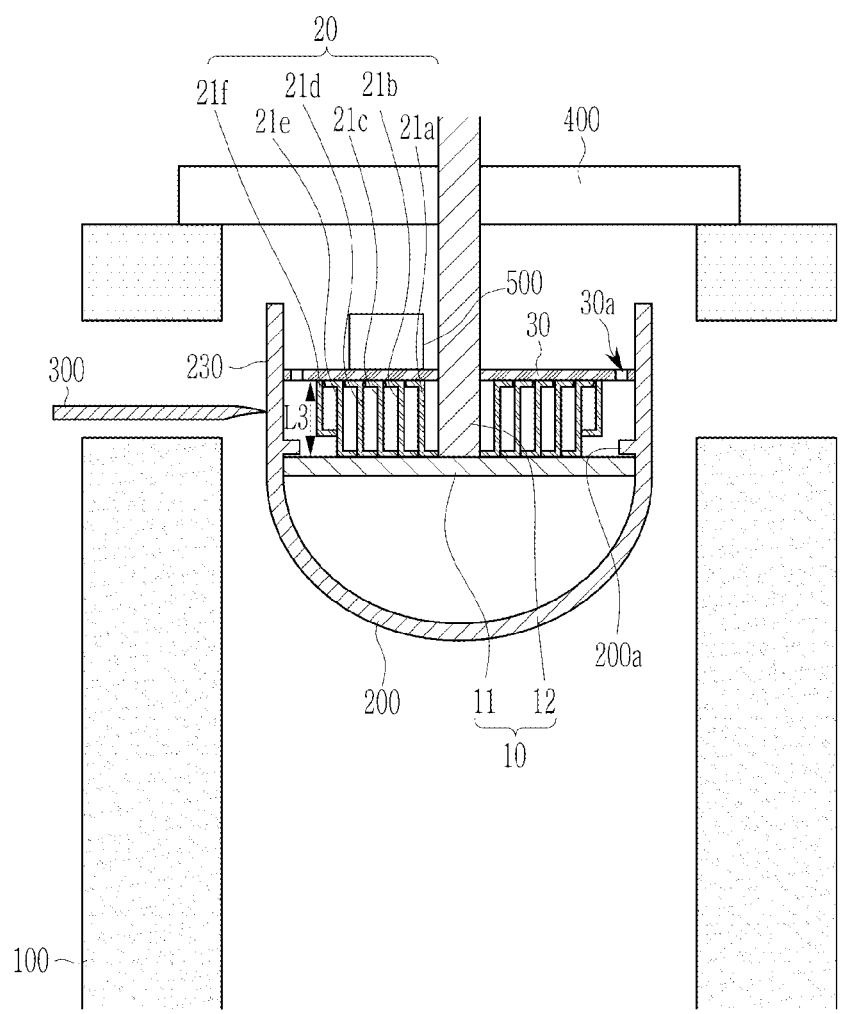
FIG. 5 illustrates a cross-sectional view of a step after that of FIG. 4.

FIG. 4 illustrates a cross-sectional view of one step of decommissioning a reactor using a nuclear reactor decommissioning system according to an embodiment, and FIG. 5 illustrates a cross-sectional view of a step after that of FIG. 4.

As shown in FIG. 4, when the reactor 200 is lifted by using the lifting device 10 in order to cut a middle portion 220 of the reactor 200 by using the cutting device 300, at least some of the cylindrical members 21a, 21b, 21c, 21d, 21e, and 21f of the shielding tube 20 are lifted together. That is, some (21a, 21b, and 21c) of the cylindrical members contacting the coupling member 11 of the lifting device 10 are lifted together with the lifting device 10. Therefore, some (21a, 21b, and 21c) of the cylindrical members overlap each other, so that a length of the shielding tube 20 may be shortened.

That is, in FIG. 1, the length of the shielding tube 20 has a length of L1, but as shown in FIG. 4, when the reactor 200 is lifted, the length of the shielding tube 20 may have a length of L2 that is smaller than L1.

In this case, the cylindrical members 21a, 21b, 21c, 21d, 21e, and 21f of the shielding tube 20 are sequentially lifted together with the elevating device 12 from the cylindrical member closest to the elevating device 12. That is, as shown in FIG. 4, the three cylindrical members 21a, 21b, and 21c closest to the elevating device 12 among the six cylindrical members are first lifted to overlap each other. However, it is not limited thereto, and various numbers of cylindrical members may overlap each other depending on an elevation height of the reactor 200.

In addition, as shown in FIG. 5, when the reactor 200 is further lifted to cut a lower end portion 230 of the reactor 200, all of the cylindrical members 21a, 21b, 21c, 21d, 21e, and 21f forming the shielding tube 20 overlap each other. Therefore, a length L3 of the shielding tube 20 further decreases.

As such, in the case of cutting from the upper end portion to the lower end portion of the reactor 200 while lifting the reactor 200, since the length of the shielding device 40 that blocks the elevating device 12 from the radioactive dust 1 may also be shortened, the shielding device 40 may be easily inserted between the elevating device 12 and the reactor 200.

The shielding plate 30 may include a plurality of ventilation parts 30a positioned between the reactor 200 and the outermost cylindrical member 21f of the shielding tube 20. As shown in FIG. 3, the plurality of ventilation parts 30a may be formed along an edge of the shielding plate 30. The shielding plate 30 may be rotated around the elevating device 12 as a central axis. Accordingly, since a position of the ventilation part 30a may be adjusted, the radioactive dust 1 may be effectively collected by adjusting the position of the ventilation part 30a according to an amount of the radioactive dust 1.

The dust blocking device 400 may block the bioprotective concrete 100 surrounding the reactor 200 from the outside.

The dust collecting device 500 may be connected to the plurality of ventilation parts 30a to collect the radioactive dust 1 collected through the ventilation parts 30a. In the present embodiment, the dust collecting device 500 is installed on the shielding plate 30, but is not limited thereto, and may be installed at various positions.

Therefore, it is possible to minimize the radioactive dust 1 from contaminating peripheral devices or being exposed to workers, by intensively collecting the radioactive dust 1 through the ventilation parts 30a formed on the shielding plate 30.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A nuclear reactor decommissioning system, comprising
a cutting device to cut a reactor,
a lifting device inserted inside the reactor to lift the reactor, and
a shielding device that is positioned between the reactor and the lifting device and blocks radioactive dust generated by the cutting device from spreading,
wherein
the lifting device includes
a coupling member coupled to the reactor, and
an elevating device that is connected to the coupling member and elevates the reactor, and
the shielding device includes
a shielding tube including at least three cylindrical members of different diameters surrounding the elevating device, and
a shielding plate positioned on an upper portion of the shielding tube and blocking the reactor from the outside, and
wherein an innermost cylindrical member of the shielding tube contacts the elevating device and an outermost cylindrical member of the shielding tube is connected to the shielding plate.

2. The nuclear reactor decommissioning system of claim 1, wherein
the plurality of cylindrical members have a larger diameter as a distance from the elevating device increases, and
respective end portions of the cylindrical members have catching projections to be caught by respective end portions of adjacent cylindrical members.

3. The nuclear reactor decommissioning system of claim 2, wherein
the catching projection includes
an outer catching projection extending from the cylindrical member to the outside, and
an inner catching projection extending from the cylindrical member to the inside.

4. The nuclear reactor decommissioning system of claim 2, wherein
when the reactor is lifted by the lifting device, at least some of the cylindrical members of the shielding tube are lifted together.

5. The nuclear reactor decommissioning system of claim 1, wherein
the shielding plate includes a plurality of ventilation parts positioned between the reactor and the outermost cylindrical member of the shielding tube.

6. The nuclear reactor decommissioning system of claim 5, wherein
the plurality of ventilation parts are formed along an edge of the shielding plate.

7. The nuclear reactor decommissioning system of claim 5, further comprising
a dust collecting device connected to the plurality of ventilation parts to collect the radioactive dust.

* * * * *